United States Patent
Chandrasekhar et al.

(10) Patent No.: US 10,057,198 B1
(45) Date of Patent: Aug. 21, 2018

(54) CONTROLLING SOCIAL NETWORK USAGE IN ENTERPRISE ENVIRONMENTS

(71) Applicant: Trend Micro Incorporated, Tokyo (JP)

(72) Inventors: Bharath Kumar Chandrasekhar, Sunnyvale, CA (US); Victor Karl Hargrave, San Mateo, CA (US); Jonathan James Oliver, Kew (AU)

(73) Assignee: Trend Micro Incorporated, Tokyo (JP)

( * ) Notice: Subject to any disclaimer, the term of this patent is extended or adjusted under 35 U.S.C. 154(b) by 245 days.

(21) Appl. No.: 14/933,966

(22) Filed: Nov. 5, 2015

(51) Int. Cl.
*H04L 12/58* (2006.01)
*H04L 29/08* (2006.01)

(52) U.S. Cl.
CPC .............. *H04L 51/12* (2013.01); *H04L 67/10* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 7,021,534 B1 | 4/2006 | Kiliccote | |
| 7,590,707 B2 | 9/2009 | McCloy, III et al. | |
| 7,802,298 B1 | 9/2010 | Hong et al. | |
| 7,854,001 B1 | 12/2010 | Chen et al. | |
| 7,984,500 B1 | 7/2011 | Khanna et al. | |
| 8,381,292 B1 | 2/2013 | Warner et al. | |
| 8,468,597 B1 | 6/2013 | Warner et al. | |
| 8,495,735 B1 | 7/2013 | Warner et al. | |
| 9,183,259 B1 * | 11/2015 | Marra ............... | G06F 17/30867 |
| 2005/0160330 A1 | 7/2005 | Embree et al. | |
| 2006/0041508 A1 | 2/2006 | Pham et al. | |
| 2006/0064374 A1 | 3/2006 | Helsper et al. | |
| 2006/0070126 A1 | 3/2006 | Grynberg et al. | |
| 2006/0080735 A1 | 4/2006 | Brinson et al. | |
| 2006/0101120 A1 | 5/2006 | Helsper et al. | |
| 2006/0123464 A1 | 6/2006 | Goodman et al. | |
| 2006/0123478 A1 | 6/2006 | Rehfuss et al. | |
| 2006/0168066 A1 | 7/2006 | Helsper et al. | |
| 2007/0112814 A1 | 5/2007 | Chesshire | |
| 2007/0118904 A1 | 5/2007 | Goodman et al. | |
| 2007/0282739 A1 | 12/2007 | Thomsen | |
| 2008/0028444 A1 | 1/2008 | Loesch et al. | |
| 2008/0034073 A1 | 2/2008 | McCloy et al. | |
| 2008/0082662 A1 | 4/2008 | Dandliker et al. | |

(Continued)

OTHER PUBLICATIONS

Seems Somebody is Clicking on That Spam—New York Times, Jul. 3, 2006, 1 sheet [retrieved on Jun. 2, 2014], retrieved from the internet: http://www.nytimes.com/2006/07/03/technology/03drill.html.

(Continued)

*Primary Examiner* — Philip Chea
*Assistant Examiner* — Hassan Khan
(74) *Attorney, Agent, or Firm* — Okamoto & Benedicto LLP (57) ABSTRACT

Social network usage in an enterprise environment is controlled by receiving and processing dynamic postings from a social network to identify indicators of prohibited content. The indicators of prohibited content are employed to identify and block prohibited postings from entering an enterprise network.

16 Claims, 5 Drawing Sheets

(56) References Cited

U.S. PATENT DOCUMENTS

| | | | |
|---|---|---|---|
| 2008/0133540 | A1 | 6/2008 | Hubbard et al. |
| 2010/0095378 | A1 | 4/2010 | Oliver et al. |
| 2011/0167474 | A1 | 7/2011 | Sinha et al. |
| 2012/0222111 | A1 | 8/2012 | Oliver et al. |
| 2012/0227104 | A1 | 9/2012 | Sinha et al. |
| 2012/0239763 | A1* | 9/2012 | Musil ............... G06Q 50/01 709/206 |
| 2013/0138735 | A1* | 5/2013 | Kanter ............... G06Q 50/01 709/204 |
| 2013/0159417 | A1* | 6/2013 | Meckler ............... H04L 67/22 709/204 |
| 2013/0298038 | A1* | 11/2013 | Spivack ............... H04L 65/403 715/753 |
| 2015/0363796 | A1* | 12/2015 | Lehman ............... G06Q 30/0201 705/7.29 |
| 2016/0142358 | A1* | 5/2016 | Zunger ............... G06Q 50/01 709/206 |
| 2016/0171109 | A1* | 6/2016 | Gnanasekaran .. G06F 17/30867 707/733 |
| 2016/0188597 | A1* | 6/2016 | Moore ............... G06F 17/3053 707/749 |
| 2016/0277349 | A1* | 9/2016 | Bhatt ............... H04L 51/32 |
| 2017/0046401 | A1* | 2/2017 | Schenk ............... G06F 17/30867 |
| 2017/0206210 | A1* | 7/2017 | Goikhman ............... H04N 21/235 |

OTHER PUBLICATIONS

Does the Twitter Follower Scam Actually Work / Security Intelligence Blog / Trend Micro, Jan. 30, 2014, 4 sheets [retrieved on Jun. 2, 2014], retrieved from the internet: http://blog.trendmicro.com/trendlabs-security-intelligence/does-tie-twitter-follower-scam-actually-work/.

Clique problem—Wikipedia, the free encyclopedia, 11 sheets [retrieved on Jun. 2, 2014], retrieved from the internet: http://en.wikipedia.org/wiki/Clique_problem.

Bipartite graph—Wikipedia, the free encyclopedia, 9 sheets [retrieved on Jun. 2, 2014], retrieved from the internet: http://en.wikipedia.org/wiki/Bipartite_graph.

Spam ROI: Profit on 1 in 12.5m Response Rate, Nov. 11, 2008, 5 sheets [retrieved on Jun. 2, 2014], retrieved from the Internet: http://www.sitepoint.com/spam-roi-profit-on-1-in-125m-response-rate/.

Trend Micro Simply Security Checking Identities in Social Network Friend Requests, Feb. 28, 2013, 5 sheets [retrieved on Jun. 2, 2014], retrieved from the internet: http://blog.trendmicro.com/checking-identities-in-facebook-friend-request/.

Facebook to put Report Abuse button at fingertips of bullying victims / Naked Security, Nov. 6, 2013, 3 sheets [retrieved on Jun. 2, 2014], retrieved from the internet: http://nakedsecurity.sophos.com/2013/11/06/facebook-to-put-report-abuse-button-at-fingertips-of-bullying-victims/.

Twitter rolls out 'report abuse' button for individual tweets: will you use it?, 4 sheets [retrieved on Jun. 2, 2014], retrieved from the internet: http://www.theguardian.com/technology/blog/2013/aug/30/twitter-report-abuse-button.

Honeypot (computing)—Wikipedia, the free encyclopedia, 4 sheets [retrieved on Jun. 2, 2014], retrieved from the Internet: http://en.wikipedia.org/wiki/Honeypot_(computing).

URL shortening-Abuse—Wikipedia, the free encyclopedia, 1 sheet [retrieved on Jun. 5, 2014], retrieved from the Internet: http://en.wikipedia.org/wiki/URL_shortening_-_Abuse.

URL shortening—Wikipedia, the free encyclopedia, 7 sheets [retrieved on Jun. 5, 2014], retrieved from the internet: http://en.wikipedia.org/wiki/URL_shortening.

URL redirection—Wikipedia, the free encyclopedia,11 sheets [retrieved on Jun. 5, 2014], retrieved from the internet: http://en.wikipedia.org/wiki/URL_redirection.

E. Zangerle and G. Specht "Sorry, I was hacked": A Classification of Compromised Twitter Accounts, Mar. 2014, 7 sheets, retrieved from the internet: http://www.evazangerle.at/wp-content/papercite-data/pdf/sac14.pdf.

J. Xiang, C. Guo and A. Aboulnaga "Scalable Maximum Clique Computation Using MapRedue", Jan. 2014, 12 sheets, retrieved from the internet: https://cs.uwaterloo.ca/~ashraf/pubs/icde13maxclique.pdf.

C. Grier, K. Thomas, V. Paxson and M. Zhang "@spam: The Underground on 140 Characters or Less", Oct. 2010, 11 sheets, In Proceeding of the 17th ACM Conference on Computer and Communications Security, retrieved from the internet: http://www.icir.org/vern/papers/ccs2010-twitter-spam.pdf.

C. Kanich, C. Kreibich, K. Levchenko, B. Enright, G. Voelker, V. Paxson and S. Savage "Spamalytics: An Emperical Analysis of Spam Marketing Conversion" 2008, 12 sheets, In Proceeding of the 15th ACM Conference on Computer and Communications Security, retrieved from the internet: http://www.icsi.berkeley.edu/pubs/networking/2008-ccs-spamalytics.pdf.

M. Egele, G. Stringhini, C. Kruegel and G. Vigna "COMPA: Detecting Comprimised Accounts on Social Networks", 2013, 17 sheets, retrieved from the internet: http://www.cs.ucsb.edu/~gianluca/papers/thjp-ndss13.pdf.

Michael Steven Svendsen "Mining maximal cliques from large graphs using MapReduce", 2012, 45 sheets, retrieved from the internet: http://lib.dr.iastate.edu/cgi/viewcontent.cgi?article=3631&context=etd.

Yun-Chian Cheng "Hadoop Sucess Stories in Trend Micro SPN", Oct. 2012, 30 sheets, retrieved from the internet: http://www.gwms.com.tw/TREND_HadoopinTaiwan2012/1002download/04.pdf.

Hung-Tsai Su, S. Tsao, W. Chu and R. Liao "Mining Web Browsing Log by Using Relaxed Biclique Enumeration Algorithm in MapReduce", 2012, 47 sheets, vol. 3, IEEE/WIC/ACM International Conferences on Web Intelligence and Intelligent Agent Technology.

Twitter Help Center—The Twitter Rules, 4 sheets (retrieved on Oct. 17, 2014), retrieved from the internet: https://support.twitter.com/articles/18311-the-twitter-rules.

* cited by examiner

| Recent Activity | | |
|---|---|---|
| Rank | Subreddit | Subscribers |
| 1 | ⓘ gonewild | 765,170 |
| 2 | ⓘ RealGirls | 436,526 |
| 3 | ⓘ nsfw | 554,042 |
| 4 | ⓘ ImGoingToHellForThis | 447,740 |
| 5 | ● NSFW_GIF | 375,126 |
| 6 | ⓘ gonewildcurvy | 146,416 |
| 7 | ⓘ BustyPetite | 185,600 |
| 8 | ⓘ rule34 | 135,815 |
| 9 | ⓘ ass | 186,079 |
| 10 | ⓘ Amateur | 211,375 |
| 11 | ⓘ CooTown | 9,606 |
| 12 | ⓘ asstastic | 101,520 |
| 13 | ⓘ ladybonersgw | 66,415 |
| 14 | ⓘ milf | 162,416 |

| Subscribers | | |
|---|---|---|
| Rank | Subreddit | Subscribers |
| 1 | ⓘ gonewild | 765,170 |
| 2 | ⓘ nsfw | 554,042 |
| 3 | ⓘ ImGoingToHellForThis | 447,740 |
| 4 | ⓘ RealGirls | 436,526 |
| 5 | ⓘ NSFW_GIF | 375,126 |
| 6 | ⓘ nsfw_gifs | 238,505 |
| 7 | ⓘ Amateur | 211,375 |
| 8 | ⓘ Boobies | 199,035 |
| 9 | ⓘ ass | 186,079 |
| 10 | ⓘ BustyPetite | 185,600 |
| 11 | ⓘ MorbidReality | 184,866 |
| 12 | ⓘ cumsluts | 169,216 |
| 13 | ⓘ LegalTeens | 164,681 |
| 14 | ⓘ OnOff | 163,643 |

| Growth (24Hrs) | | |
|---|---|---|
| Rank | Subreddit | Growth |
| 1 | ⓘ CumTV | 50% |
| 2 | ⓘ MyPrettyFace | 47.12% |
| 3 | ⓘ pinchingnipples | 46.13% |
| 4 | ⓘ ShittyHandbras | 30.1% |
| 5 | ⓘ badchinese | 24.32% |
| 6 | ⓘ Nsfw_Expressions | 19.69% |
| 7 | ⓘ HiddenStrapon | 19.27% |
| 8 | ⓘ derevocsid | 15.1% |
| 9 | ⓘ ShowerOrange | 14.71% |
| 10 | ⓘ veryhairy | 13.85% |
| 11 | ⓘ malemodelsNSFW | 13.82% |
| 12 | ⓘ GiddyUpCowGirls | 11.62% |
| 13 | ⓘ cumbuddies | 7.06% |
| 14 | ⓘ YayinternetLol | 6.12% |

CONTROLLING SOCIAL NETWORK USAGE IN ENTERPRISE ENVIRONMENTS

BACKGROUND OF THE INVENTION

1. Field of the Invention

The present invention relates generally to computer security.

2. Description of the Background Art

Social networks, such as the TWITTER, FACEBOOK, and REDDIT social networks, allow end-users to post and share messages. Social networks have become so widespread that end-users access them not only during personal time but also during work hours. In particular, employees may use social networks for productivity, work, personal, or other reasons. One problem with employee access to social networks is that the content exchanged on these networks is very broad and may be against company policy. It is thus desirable for companies and other organizations to be able to control the social network usage on their computer network.

SUMMARY

In one embodiment, social network usage in an enterprise environment is controlled by receiving and processing dynamic postings from a social network to identify indicators of prohibited content. The indicators of prohibited content are employed to identify and block prohibited postings from entering an enterprise network.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Social network usage in enterprise environments has become so prevalent that many computer security products provide a solution for controlling social network usage. Generally speaking, these solutions consist of identifying applications involving social networks and then either blocking the applications or monitoring them. Other solutions that claim to monitor so-called "Shadow IT" go to the next level by doing log analysis along with packet analysis to determine the application usage and the volume of usage per user basis, etc. These solutions claim to have advanced features that include the ability to control certain aspects of the social network applications in a granular way, such as prohibiting posting of pictures but allow viewing.

A major problem with currently available solutions for controlling social network usage in an enterprise environment is their inability to effectively analyze dynamic content, i.e., new content that has just been created. For example, the TWITTER and FACEBOOK social networks have a so-called "trending" feature. In a nutshell, trending comprises updates or tweets that are specifically tagged for interest counting (e.g., user clicks, viewing) and, when the count reaches a particular threshold, the social network starts showing them as "trending" topics. The YAHOO! web portal has similar features. The contents of these trending topics are dynamic in that the contents vary, such as every minute or even more frequently. Because of the dynamic nature of the trending topics, it is relatively difficult for an enterprise to identify the type of content included in the trending topics. More particularly, unlike a static webpage that stays unchanged long enough for a computer security vendor to detect and categorize, dynamic contents are constantly changing as end-users add to them, making categorization relatively difficult. As a particular example, assuming an enterprise's security policy does not allow any "riots" related content to be on their computer network, the enterprise may not be able to block updates or tweets that are tagged "Ferguson" even though there was a riot in Ferguson, Mo.

Figure 1:
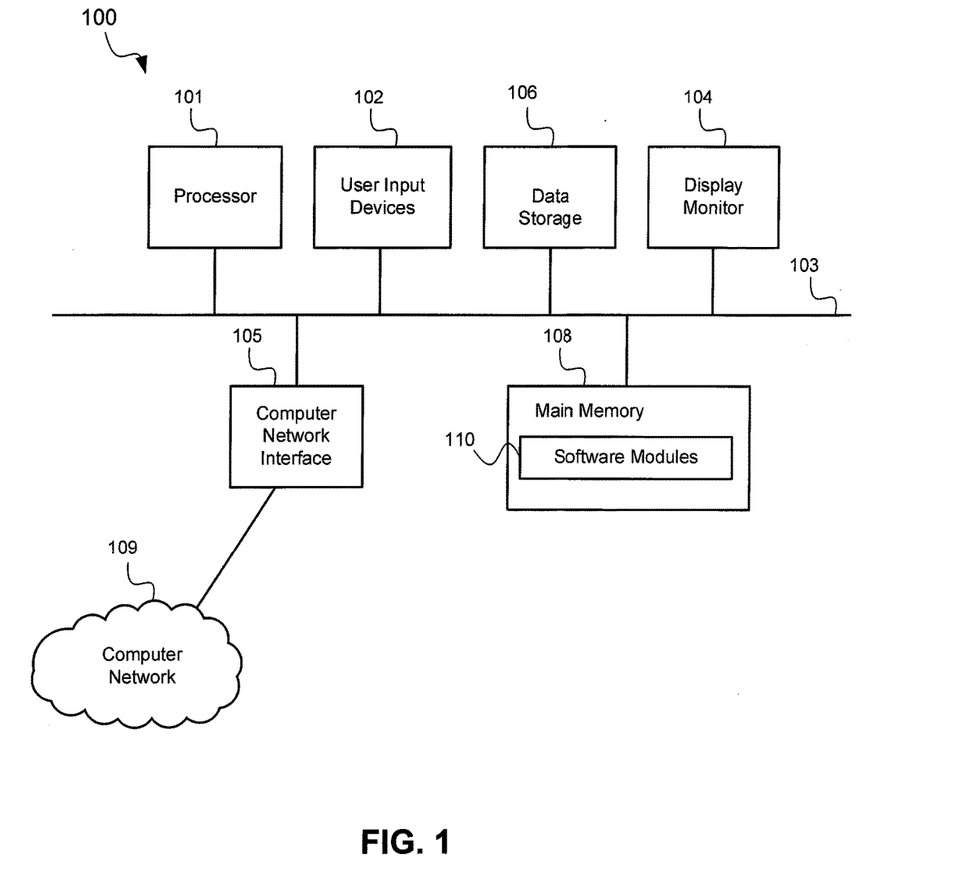
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as part of a security system, content enforcement endpoint, or other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
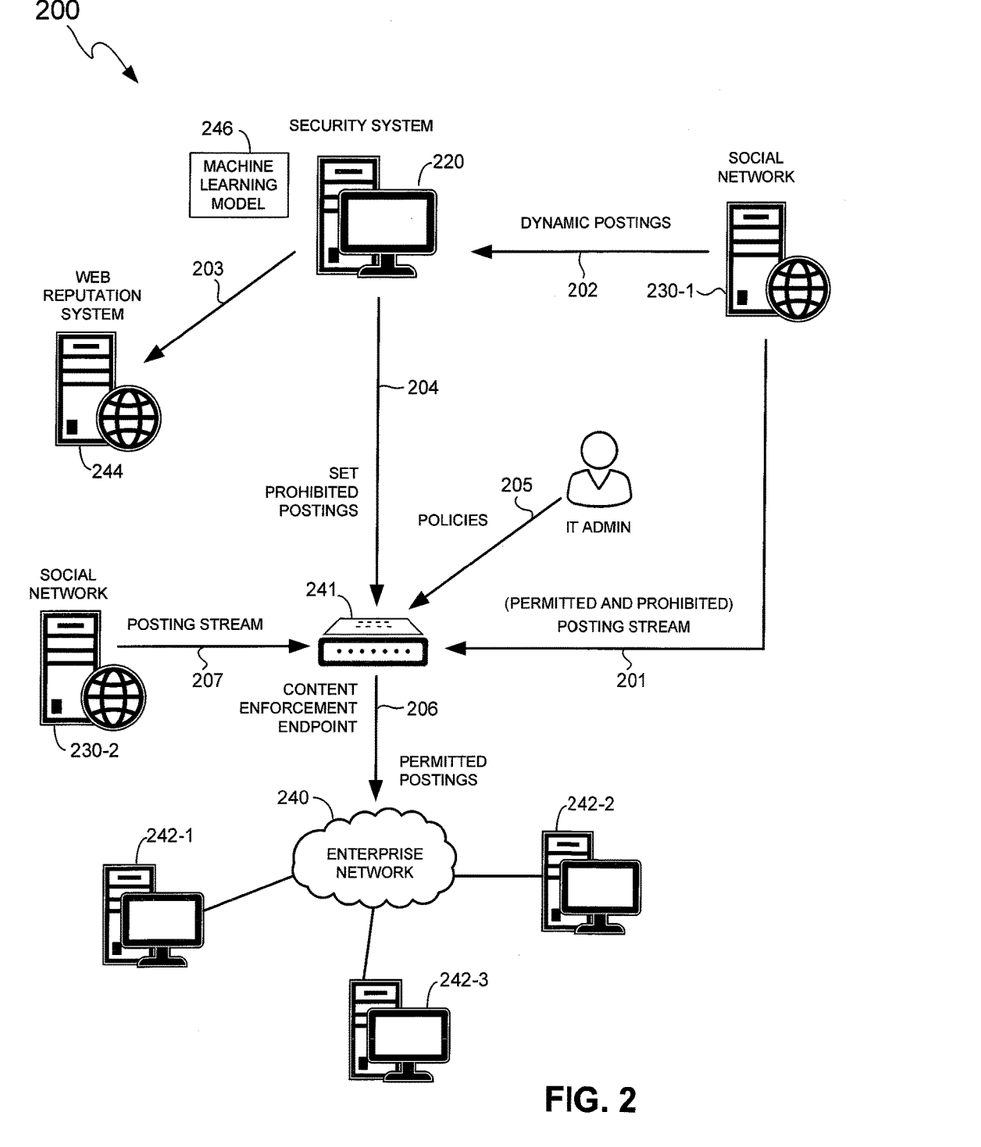
FIG. 2 shows a schematic diagram of a system for controlling social network usage in an enterprise environment in accordance with an embodiment of the present invention.

FIG. 2 shows a schematic diagram of a system 200 for controlling social network usage in an enterprise environment in accordance with an embodiment of the present invention. In the example of FIG. 2, the system 200 comprises a security system 220 and a content enforcement endpoint 241. In one embodiment, the system 200 is employed to identify prohibited postings from social networks 230 (i.e., 230-1, 230-2, etc.).

A social network 230 may comprise one or more computers that are configured to provide a social network service. A social network 230 may comprise the social network infrastructure of the TWITTER, REDDIT, FACEBOOK, or other social network. End-users of a social network create messages by posting. A posting may be a tweet in the case of the TWITTER social network, a thread (also referred to as a "reddit") in the case of the REDDIT social network, or simply a post in the case of the FACEBOOK social network. A posting may also be other user-created messages on other social networks.

In the example of FIG. 2, the enterprise environment comprises an enterprise network 240. The enterprise network 240 may comprise the private (i.e., not generally accessible to the public) computer network of an organization, such as a company, a small business, a government, etc. The enterprise environment may include a plurality of computers 242 (i.e., 242-1, 242-2, 242-3, etc.). A computer 242 may be a user-computer, such as a laptop computer, a desktop computer, a mobile device, etc. A computer 242 may also be a server computer or other computer typically found in an enterprise network.

The content enforcement endpoint 241 and/or the security system 220 may be on-premise within the perimeter of enterprise network 240. The content enforcement endpoint 241 and/or the security system 220 may also be off-premise (i.e., outside the perimeter of the enterprise network 240), such as in the case when the control of social network usage is provided in-the-cloud by a third-party computer security service (e.g., TREND MICRO SMART PROTECTION NETWORK security service).

In the example of FIG. 2, the content enforcement endpoint 241 is configured to receive all network traffic to and from the enterprise network 240. The content enforcement endpoint 241 may comprise one or more computers that provide gateway, firewall, content filtering, and other computer security functions. In the example of FIG. 2, the content enforcement endpoint 241 receives a posting stream from a social network 230. The content enforcement endpoint 241 may be configured to receive and analyze a posting stream to enforce computer security policies of the enterprise network 240. The computer security policies may indicate prohibited postings, i.e., postings that are not allowed on the computer network 240. A posting stream (e.g., see arrows 201 and 207) may include both prohibited and permitted postings on a social network 230. In the example of FIG. 2, the content enforcement endpoint 241 is configured to receive a posting stream and to identify and block prohibited postings. In one embodiment, the content enforcement endpoint 241 deems postings that are not prohibited as "permitted postings." The content enforcement endpoint 241 may be configured to allow permitted postings to enter the enterprise network 240.

The security system 220 may comprise one or more computers that are configured to receive dynamic postings from a social network 230, to set filtering criteria for filtering a posting stream from the social network 230, to receive and index filtered postings that are filtered from the posting stream based on the filtering criteria, to process the filtered postings to identify prohibited postings, and to provide the content enforcement endpoint 241 the identity and/or indicators of the prohibited postings. The security system 220 may be operated by the administrator or other information technology (IT) personnel of the enterprise network 240 or computer security vendor using scripts, software development kits (SDK), application programming interface (API), and other tools.

In an example operation, a social network 230-1 may be providing a posting stream to one or more computers of the enterprise network 240 (arrow 201). The posting stream may include permitted and prohibited postings. That is, the posting stream as received by the content enforcement endpoint 241 may include postings that are prohibited by one or more computer security policies of the enterprise network 240. The posting stream may also include postings that are not specifically prohibited by a computer security policy, and are thus permitted on the enterprise network 240.

In the example of FIG. 2, the security system 220 receives representative dynamic postings from the social network 230-1 (arrow 202). In one embodiment, the dynamic postings are posts that include dynamic content, such as top trending topics, live threads, subreddits, etc. The dynamic postings are "dynamic" in that they comprise newly-created real-time contents. The criteria for filtering a posting stream may be identified and extracted from the dynamic postings. In one embodiment, the filtering criteria comprise words and phrases that are indicative of a particular content. The dynamic postings include the latest news and happenings, allowing for correlation of prohibited content with current events. In the "riots" example, assuming the riots are still occurring in Ferguson, Mo. or still in the news as indicated on the dynamic postings, "Ferguson" may be selected as a filtering criterion.

The security system 220 may be configured to ingest and process dynamic postings to identify prohibited postings or characteristics of prohibited postings. In one embodiment, uniform resource locators (URLs) extracted from dynamic postings, sites that are linked in the dynamic postings, etc. may be categorized by, for example, consulting a web reputation system 244 (arrow 203). The web reputation system 244 may indicate the category of the URL (e.g., whether the URL or site linked by the URL belongs to the "sports", "politics", "pornography," etc.) and whether a URL has a bad reputation (e.g., malicious), a good reputation, or an unknown reputation. A posting containing a URL with a bad reputation may be deemed to be a prohibited posting. In that case, the URL may be used as an indicator of a prohibited posting, i.e., any posting with the URL may be deemed to be prohibited. Other features of identified prohibited posting, such as its username (e.g., hashtag), may also be used as indicators of prohibited postings. The category of a feature of a posting (e.g., embedded URLs, linked sites, etc.) may be assigned to the posting.

In one embodiment, the security system 220 includes a machine learning model 246 for correlation, categorization, and identifying indicators of prohibited postings. For example, the content of a posting may be run through the machine learning model 246 to determine the category of the posting, etc. A posting may be deemed prohibited if it belongs to a prohibited category as indicated by one or more computer security policies. The machine learning model 246 may be trained using rules and samples obtained from analyzed posting streams and other sources, such as honeypots. The machine learning model 246 may be created using suitable machine learning algorithm, such as support vector machine (SVM), for example.

Sites (i.e., websites and other computer nodes on the Internet) that are linked in a posting may be followed to determine a category of the posting. For example, a posting with a link to a political site may be categorized as "controversial" (and prohibited in an enterprise environment) because political sites typically have different views on politics. A posting may be in one or more categories and may be deemed to be prohibited if any of the categories is prohibited by a computer security policy.

The security system 220 may set the prohibited postings based on its processing of the dynamic postings (arrow 204). In one embodiment, the security system 220 informs the content enforcement endpoint 241 the particular postings that are prohibited and/or the indicators of prohibited postings. For example, the content enforcement endpoint 241 may receive URLs and/or usernames of prohibited postings from the security system 220, and block postings that include those URLs and/or usernames. The content enforcement endpoint 241 is thus able to identify and block prohibited postings that are incoming with the posting stream. An IT administrator may also set prohibited postings by indicating them in computer security policies (arrow 205). The content enforcement endpoint 241 allows permitted postings, i.e., postings that are not prohibited, to enter the enterprise network 240 (arrow 206). The process of receiving and analyzing dynamic postings to identify prohibited postings may be performed periodically, e.g., at least every hour or more frequently, to keep up with dynamically changing postings.

In one embodiment, information obtained by analyzing postings of one social network may be employed to control usage of another social network. For example, indicators of prohibited postings identified by processing the dynamic postings of the social network 230-1 may also be employed by the content enforcement endpoint 241 to identify prohibited postings in the posting stream of the social network 230-2 (arrow 207). For example, URLs that indicate prohibited postings on the social network 230-1 may also be used as indicators of prohibited postings on the social network 230-2.

As can be appreciated, the system 200 may be employed to control usage of different social networks. For example, the system 200 may be employed to control usage of the TWITTER social network in the computer network 240 as now explained beginning with FIG. 3.

Figure 3:
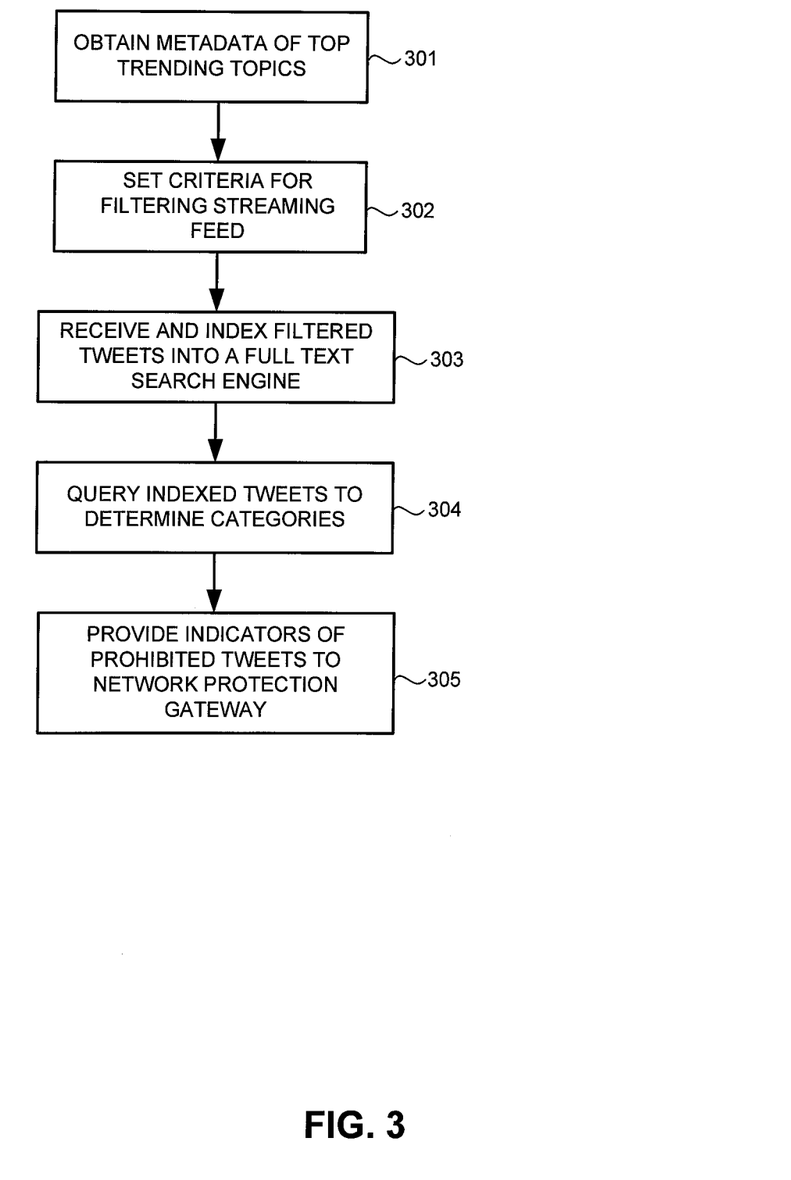
FIG. 3 shows a flow diagram of a method of controlling social network usage in an enterprise environment in accordance with an embodiment of the present invention.

FIG. 3 shows a flow diagram of a method of controlling social network usage in an enterprise environment in accordance with an embodiment of the present invention. The method of FIG. 3 may be performed using the system 200 to control usage of the TWITTER social network in the enterprise network 240.

In the example of FIG. 3, the metadata of the top trending topics (e.g., top 100 trending topics) of the TWITTER social network are obtained (step 301). The TWITTER social network has published an SDK to allow third-party systems to ingest tweets from a continuously available feed for further analysis. The TWITTER social network offers two types of feeds: a public sample feed that represents 1% of the tweet traffic and a commercially-available Firehose feed that provides 100% of the tweet stream. The security system 220 may obtain metadata of top trending topics from the public sample feed or Firehose feed. The tweet metadata may indicate the end-user who posted the tweet, number of times the tweet has been re-tweeted, number of times the tweet has been favorited, time of posting, location from which the tweet has been posted, associated hashtags, etc. The tweet metadata may be used to set the criteria for filtering the TWITTER streaming feed to generate filtered tweets (step 302). The filtered tweets may also simply be the TWITTER-provided public sample feed that represents 1% of the tweet traffic.

The filtered tweets may be received in the security system 200 and indexed into a full text search engine (step 303). For example, the filtered tweets may be indexed in the Elasticsearch search engine or other suitable search engines. The indexed tweets may be queried using the search engine to determine the categories of the tweets (step 304). The categories may include "porn", "riots", "violence", etc. or other categories that are dictated by one or more computer security policies enforced by the content enforcement endpoint 241.

The category of a tweet, and hence its hashtag, may be based on the category of a URL included in the tweet or the category of the TWITTER URL of the end-user who posted the tweet. For example, a tweet may include a shortened URL. To determine the category of the tweet, the shortened URL may be followed to determine the full URL that corresponds to the shortened URL. The category of the full URL may be obtained by consulting a web reputation system, using a machine learning model, by inspection, etc. The distribution channels of the full URL may also be investigated to determine the category of the full URL. The TWITTER handles (i.e., usernames) of tweets that contain the URLs may also be investigated to determine the category of a tweet. For example, some famous sports personalities have verified TWITTER handles, making tweets by those TWITTER handles likely to be in the "sports" category. The same procedure may be performed for other verified TWITTER handles.

Information obtained by categorizing the indexed tweets may be used to identify prohibited tweets. In the example of FIG. 3, the security system 220 may provide indicators of prohibited tweets to the content enforcement endpoint 241 (step 305). The indicators of prohibited tweets may include URLs and TWITTER handles that are in a prohibited category. The content enforcement endpoint 241 may scan incoming tweets to the enterprise network 240, and block tweets that include the identified URLs or tweets from the identified TWITTER handles.

The system 200 may also be adapted to control usage of the REDDIT social network in the computer network 240. The REDDIT social network, having a primary website address of <<www.reddit.com>>, also has a lot of dynamic content in, for example, live threads and sub-groups that are called subreddits. Live threads primarily capture live events as they are happening, similar to the "trending" topics on the TWITTER and FACEBOOK social networks. Live threads typically go to background (while still staying alive) as more and more new threads arise. The contents of a live thread may be accessed from <<http://www.reddit.comni<livethread-name>>>.

Figure 4:
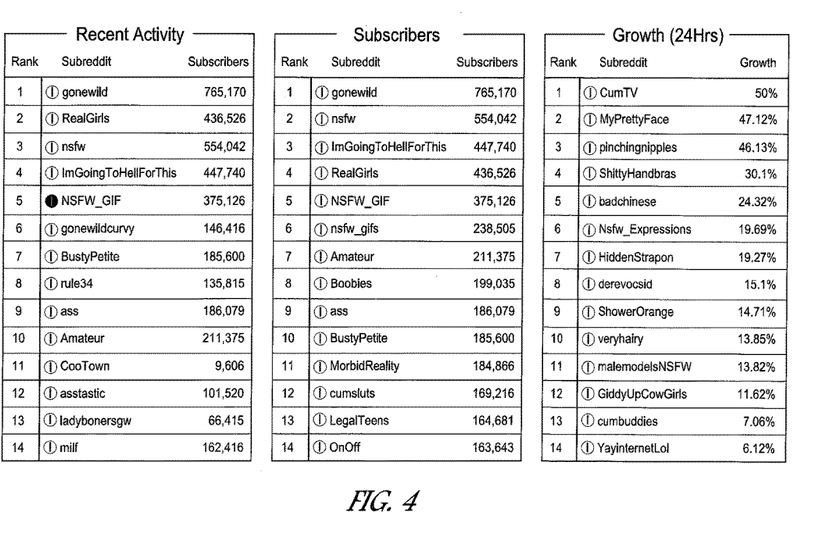
FIG. 4 shows a snapshot of example subreddits.

Subreddits, like live threads, are also dynamic and created by end-users. A subreddit gains prominence as more and more end-users post to it. The contents of a subreddit may be accessed from <<http://wwvv.reddit.com/d<subreddit-name>>>. The number of subreddits is relatively large and the categorizations of sub-reddits are very broad. For example, FIG. 4 shows a snapshot of subreddits that are categorized as NSFW (Not Safe For Work). Typically, live threads and subreddits are not categorized as they are being created, making it difficult to apply computer security policies to them. The subreddits shown in FIG. 4 may eventually be marked by an administrator of the REDDIT social network as "Over-18" based on end-user feedback or by the end-users themselves. As can be appreciated, relying on end-users to facilitate or perform categorization is not reliable.

The categorization problem involving the REDDIT social network becomes worse when contents of so-called "big events" show up on the REDDIT social network. One example is the case of stolen private photos from an iCloud hack. The stolen private photos were first posted on the 4chan site but were viewed the most on the REDDIT social network. The corresponding dynamically created subreddit was <<http://www.reddit.com/r/thefappening>>, which was accessible for a week before being disabled. Because the subreddit was not properly categorized, some end-users on enterprise networks were able to view the subreddit even with computer security policies being enforced.

Figure 5:
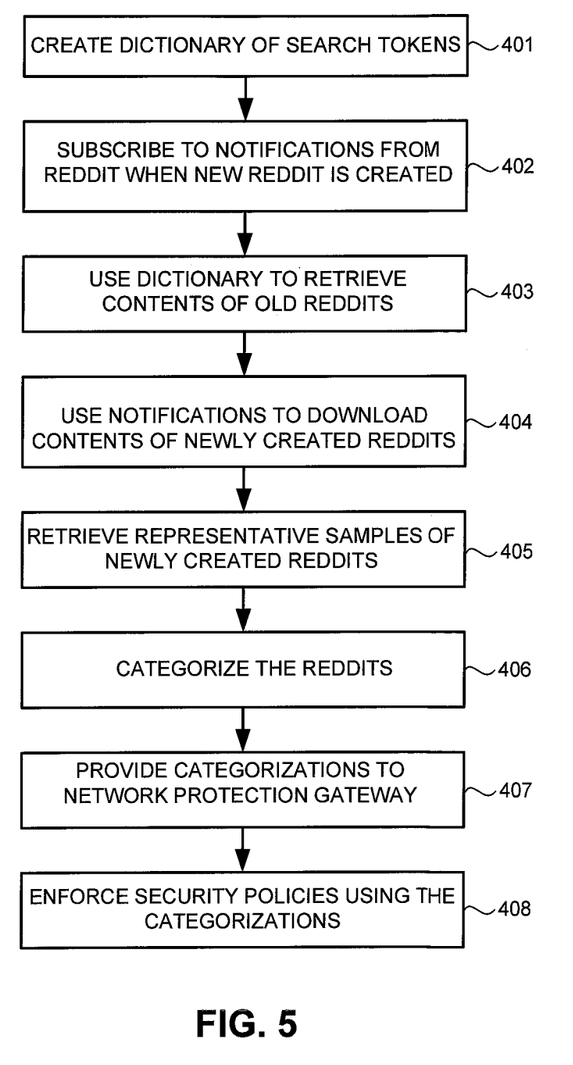
FIG. 5 shows a flow diagram of a method of controlling social network usage in an enterprise environment in accordance with an embodiment of the present invention.

FIG. 5 shows a flow diagram of a method of controlling social network usage in an enterprise environment in accordance with an embodiment of the present invention. The method of FIG. 5 may be performed using the system 200 to control usage of the REDDIT social network in the enterprise network 240. The method of FIG. 5 may be performed using API's, which are described in the REDDIT Developer API available at <<http://www.reddit.com/dev/api>>. Example APIs that may be used include, but are not limited to, <<http://www.reddit.com/dev/api#GET_api_subreddits_by_topic>>, <<http://www.reddit.com/dev/api#GET_subreddits_where>>, <<http://www.reddit.com/dev/api#POST_marknsfw>>, and <<http://www.reddit.com/dev/api#GET_api_search_reddit_names>>.

In the example of FIG. 5, a dictionary of search tokens is created (step 401). The tokens may comprise words and phrases that serve as indicators of particular contents. As their name implies, the tokens may be used to search reddits, which for purposes of the present disclose include subreddits, live streams, and live updates. To process new reddits, a subscription is made to receive notifications from the REDDIT social network whenever a new reddit is created (step 402). The dictionary is used to retrieve the contents of old, currently existing reddits (step 403). The notifications are used to download the contents of newly created reddits (step 404). Representative newly created and old reddits are retrieved for categorization (step 405). The amount of reddits to be retrieved as representative samples for categorization will depend on available computing resources. The contents of the representative samples are analyzed to determine their categories (step 406). For example, the contents of the reddits that are retrieved for categorization may be passed through a categorization engine (e.g., a machine learning model) to determine the categories of the reddits. The categorizations of the reddits may be provided to the content enforcement endpoint to enforce computer security policies (step 407). More particularly, the categorizations allow the content enforcement endpoint to identify and block reddits that belong to a prohibited category.

Methods and systems for controlling social network usage in enterprise environments have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of controlling social network usage in an enterprise environment, the method comprising:
   receiving dynamic postings from a first posting stream from a first social network, the dynamic postings comprising dynamically changing and trending contents on the first social network, the first posting stream being received by way of an application programming interface provided by the first social network;
   identifying indicators indicative of prohibited content from the dynamic postings by categorizing contents of the dynamic postings using a machine learning model or categorizing Uniform Resource Locators (URLs) included in the dynamic postings by consulting a web reputation system, wherein the indicators comprise content or URL that has been categorized as prohibited in accordance with one or more security policies of the enterprise environment;
   providing the indicators to a content enforcement endpoint that receives a second posting stream from the first social network, the second posting stream being for a user computer in the enterprise environment protected by the content enforcement endpoint;
   scanning, by the content enforcement endpoint, the second posting stream using the indicators to identify and block prohibited postings that are included in the second posting stream;
   wherein identifying the indicators indicative of prohibited content comprises:
   obtaining metadata of selected postings that are designated as top trending topics;
   indexing the selected postings into a text search engine; and
   querying the selected postings to determine categories of the selected postings;
   wherein providing the indicators to the content enforcement endpoint comprises:
   informing the content enforcement endpoint of uniform resource locators included in postings in the selected postings that belong to a prohibited category.

2. The method of claim 1, further comprising:
   scanning, by the content enforcement endpoint, a third posting stream from a second social network using the same indicators to identify and block prohibited postings that are included in the third posting stream.

3. The method of claim 1, wherein the first social network is the TWITTER social network.

4. The method of claim 3, wherein the dynamic postings comprise trending topics in the TWITTER social network.

5. The method of claim 1, wherein the first social network is the REDDIT social network.

6. The method of claim 5, wherein the dynamic postings comprise subreddits.

7. A system for controlling social network usage in an enterprise environment, the system comprising:
   a first social network comprising one or more computers that comprise a processor and a memory, the first social network being configured to provide a social network service;
   a security system comprising one or more computers that comprise a processor and a memory, the security system being configured to receive dynamic postings from a first posting stream from the first social network by way of an application programming interface provided by the first social network, and process the dynamic postings to identify indicators indicative of prohibited content by categorizing contents of the dynamic postings using a machine learning model or by categorizing Uniform Resource Locators (URLs) included in the dynamic postings by consulting a web reputation system, wherein the indicators comprise content or URL that has been categorized as prohibited in accordance with one or more security policies of the enterprise environment, wherein the dynamic postings comprise dynamically changing and trending contents on the first social network;

a content enforcement endpoint comprising one or more computers that comprise a processor and a memory, the content enforcement endpoint being configured to receive a second posting stream from the first social network and scan the second posting stream using the indicators to identify and block prohibited postings that are included in the second posting stream, the second posting stream being directed to a user computer in the enterprise environment protected by the content enforcement endpoint; and wherein the one or more computers of the content enforcement endpoint are configured to receive a third posting stream from a second social network and scan the third posting stream from the second social network using the same indicators to identify and block prohibited postings that are included in the third posting stream.

8. The system of claim 7, wherein the first social network is the TWITTER social network.

9. The system of claim 8, wherein the dynamic postings comprise trending topics in the TWITTER social network.

10. The system of claim 7, wherein the first social network is the REDDIT social network.

11. The system of claim 10, wherein the dynamic postings comprise subreddits.

12. The system of claim 7, wherein the content enforcement endpoint comprises a gateway.

13. A computer-implemented method of controlling social network usage in an enterprise environment, the method comprising:

receiving dynamic postings from a first posting stream from a first social network, the dynamic postings comprising dynamically changing and trending contents on the first social network and being received by way of an application programming interface provided by the first social network;

processing the dynamic postings to identify indicators indicative of prohibited content by categorizing content of the dynamic postings using a machine learning model or by categorizing Uniform Resource Locators (URLs) included in the dynamic postings by consulting a web reputation system, wherein the indicators comprise a content or URL that has been categorized to be in a prohibited category in accordance with one or more security policies of the enterprise environment;

providing the indicators to a gateway that uses the indicators to scan a second posting stream from the first social network to identify and block prohibited postings, the second posting stream being directed to a user computer within the enterprise environment protected by the gateway; and scanning, by the gateway, a third posting stream from a second social network using the same indicators to identify and block prohibited postings that are included in the third posting stream.

14. The method of claim 13, wherein the dynamic postings comprise subreddits.

15. The method of claim 13, wherein the dynamic postings comprise tweets.

16. The method of claim 13, wherein processing the dynamic postings to identify the indicators indicative of prohibited content comprises:

retrieving contents of old postings;
retrieving samples of new postings; and
categorizing the old and the new postings.

* * * * *